United States Patent
Koike et al.

(10) Patent No.: US 7,638,978 B2
(45) Date of Patent: Dec. 29, 2009

(54) BATTERY PROTECTION DEVICE AND BATTERY HAVING THE SAME

(75) Inventors: Masaki Koike, Yokohama (JP); Yasuaki Hiramura, Yokohama (JP)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 349 days.

(21) Appl. No.: 11/642,980

(22) Filed: Dec. 21, 2006

(65) Prior Publication Data

US 2007/0170894 A1 Jul. 26, 2007

(30) Foreign Application Priority Data

Dec. 21, 2005 (JP) ............... 2005-368443

(51) Int. Cl.
*H02J 7/00* (2006.01)
*H01M 2/00* (2006.01)
*H01M 2/34* (2006.01)
*H01M 10/50* (2006.01)

(52) U.S. Cl. .............. 320/136; 429/61; 429/7; 429/62

(58) Field of Classification Search .......... 320/106, 320/107, 112, 113, 114, 115, 134, 136, 150, 320/153, 154; 429/7, 61, 62, 65, 66, 67, 429/68

See application file for complete search history.

(56) References Cited

U.S. PATENT DOCUMENTS 5,689,173 A * 11/1997 Oosaki et al. ........... 429/7
5,826,958 A * 10/1998 Avitan ................ 320/136
6,025,699 A * 2/2000 Cummings ............ 320/136
6,432,575 B1* 8/2002 Yamagami ............ 429/100
6,570,749 B1* 5/2003 Ling et al. ............ 361/102
6,893,753 B2* 5/2005 Iwaizono et al. ........ 429/7
2002/0150815 A1* 10/2002 Ehara ................ 429/90
2004/0189245 A1* 9/2004 Teraoka et al. ......... 320/107

FOREIGN PATENT DOCUMENTS

JP        2000-182598       6/2000

* cited by examiner

*Primary Examiner*—Edward Tso
*Assistant Examiner*—M'Baye Diao
(74) *Attorney, Agent, or Firm*—Lee & Morse P.C.

(57) ABSTRACT

A battery protection device may include a thermally responsive operating plate having two plates secured together, the two plates having different coefficients of thermally expansion, an electrically conductive member, and a stopper with which the thermally responsive operating plate can be interlocked. The battery protection device may have a recoverable region current cutoff state, where the thermally responsive operating plate is not interlocked with the stopper, and a contact and dissociation of the thermally responsive operation plate with and from the electrically conductive member can be repeatedly realized. The battery protection device may have an unrecoverable region current cutoff state, where the thermally responsive operating plate is interlocked with the stopper and the thermally responsive operation plate is unrecoverably dissociated from the electrically conductive member.

22 Claims, 7 Drawing Sheets

BATTERY PROTECTION DEVICE AND BATTERY HAVING THE SAME

BACKGROUND OF THE INVENTION

1. Field of the Invention

The present invention relates to a battery protection device. More particularly, the present invention relates to a battery protection device that prevents fire and/or explosion caused by abnormal heat generation, and to a battery having the battery protection device.

2. Description of the Related Art

As a driving power source for portable electronic devices, secondary batteries that can be repeatedly charged and discharged and have a relatively low environmental load have been developed. In a secondary battery, a separator may be installed between a positive electrode and a negative electrode. The charging/discharging of the secondary battery may be realized as lithium ions (Li+) travel between the positive and negative electrodes. Thus, secondary batteries can be repeatedly used.

However, if a secondary battery is overcharged, or if a number of charge/discharge cycles of the secondary battery exceeds an advised range, lithium dendrites may form. When lithium dendrites are formed, they may penetrate the separator and make contact with the positive electrode, thereby causing a short circuit.

A short circuit may cause excess heat to be generated in the battery. Thus, an electrolyte provided in the separator may boil. Such boiling may cause the battery to catch on fire or explode.

In order to prevent this, a protection device may be provided in the secondary battery. Such a protection device may detect abnormal heat generation or a pressure increase, e.g., using a thermal relay, and may reduce a transport current of a battery circuit, safely discharging a residual battery capacity (electric energy), thus enhancing safety of the battery.

However, since the thermal relay is unrecoverable once abnormal heat generation occurs in the second battery, the secondary battery cannot be reused. Other solutions, such as an unrecoverable fuse, a recoverable poly-switch or bimetal switch, a current/voltage detection protective circuit, and a combination thereof have been proposed. However, with the use of these other solutions, the manufacturing process is complicated and the number of parts increases, thereby increasing manufacturing costs.

SUMMARY OF THE INVENTION

The present invention is therefore directed to a battery protection device and a battery having the same, which substantially overcome one or more of the problems due to the limitations and disadvantages of the related art.

It is therefore a feature of an embodiment of the present invention to provide a battery protection device having an unrecoverable region current cutoff state and a recoverable region current cutoff state.

It is another feature of an embodiment of the present invention to provide a battery having the protection device.

It is yet another feature of an embodiment of the present invention to provide a battery protection device that safely consumes residual battery capacity.

At least one of the above and other features and advantages of the present invention may be realized by providing a battery protection device including a thermally responsive operating plate having two plates secured together, the two plates having different coefficients of thermal expansion, an electrically conductive member, and a stopper with which the thermally responsive operating plate can be interlocked. The battery protection device includes a recoverable region current cutoff state, where the thermally responsive operating plate is not interlocked with the stopper, and electrical contact and dissociation of the thermally responsive operation plate with and from the electrically conductive member can be repeatedly realized, and an unrecoverable region current cutoff state, where the thermally responsive operating plate is interlocked with the stopper, and the thermally responsive operation plate is unrecoverably dissociated from the electrically conductive member.

When a temperature exceeds a predetermined temperature, the thermally responsive operating plate may be interlocked with the stopper. The predetermined temperature may be between about 90° C. to 110° C.

The two plates may be metal plates, e.g., may be a nickel plate and a nickel-alloy plate.

The battery protection device may enter the recoverable region current cutoff state when a temperature increases above a first temperature. Below the first temperature, the thermally responsive operating plate may be in continuous electrical contact with the electrically conductive member. When a temperature increases above a second temperature, the battery protection device may enter the unrecoverable region current cutoff state. The second temperature may be between about 90° C. to 110° C. The first temperature may be about 75° C.

The stopper may be formed of metal, a metal alloy, an electrically conductive resin containing metal particles or carbon particles, or a positive temperature coefficient material containing polymer or ceramic.

At least one of the above and other features and advantages of the present invention may be realized by providing a battery including a battery unit and the battery protection device.

The battery may include a discharge resistor provided between the positive electrode and the first output terminal and/or between the negative electrode and the second output terminal. A resistance of the discharge resistor may be between about 1.0 kΩ to 10 kΩ.

The battery protection device may enter the unrecoverable region current cutoff state when a temperature increases above a second temperature, which may be less than a boiling point of an electrolyte used in the battery unit.

At least one of the above and other features and advantages of the present invention may be realized by providing a battery pack including the battery unit, the battery protection device and a discharge circuit.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIGS. 3A through 3C illustrates schematic views of an operation of a battery protection device according to an exemplary embodiment of the present invention, wherein FIG. 3A shows a recoverable region current cutoff state that is electrically conductive, FIG. 3B shows a recoverable region current cutoff state that is not electrically conductive, and FIG. 3C shows an unrecoverable region current cutoff state;

FIGS. 4A and 4B illustrate schematic views of a battery protection device according to another exemplary embodiment of the present invention, wherein FIG. 4A illustrates a recoverable region current cutoff state and FIG. 4B illustrates a sectional view taken along line I-I of FIG. 4A;

FIGS. 5A and 5B illustrate schematic views of the battery protection device of FIGS. 4A and 4B, wherein FIG. 5A illustrates an unrecoverable region current cutoff state and FIG. 5B illustrates a sectional view taken along line II-II of FIG. 5A;

DETAILED DESCRIPTION OF THE INVENTION

Figure 1:
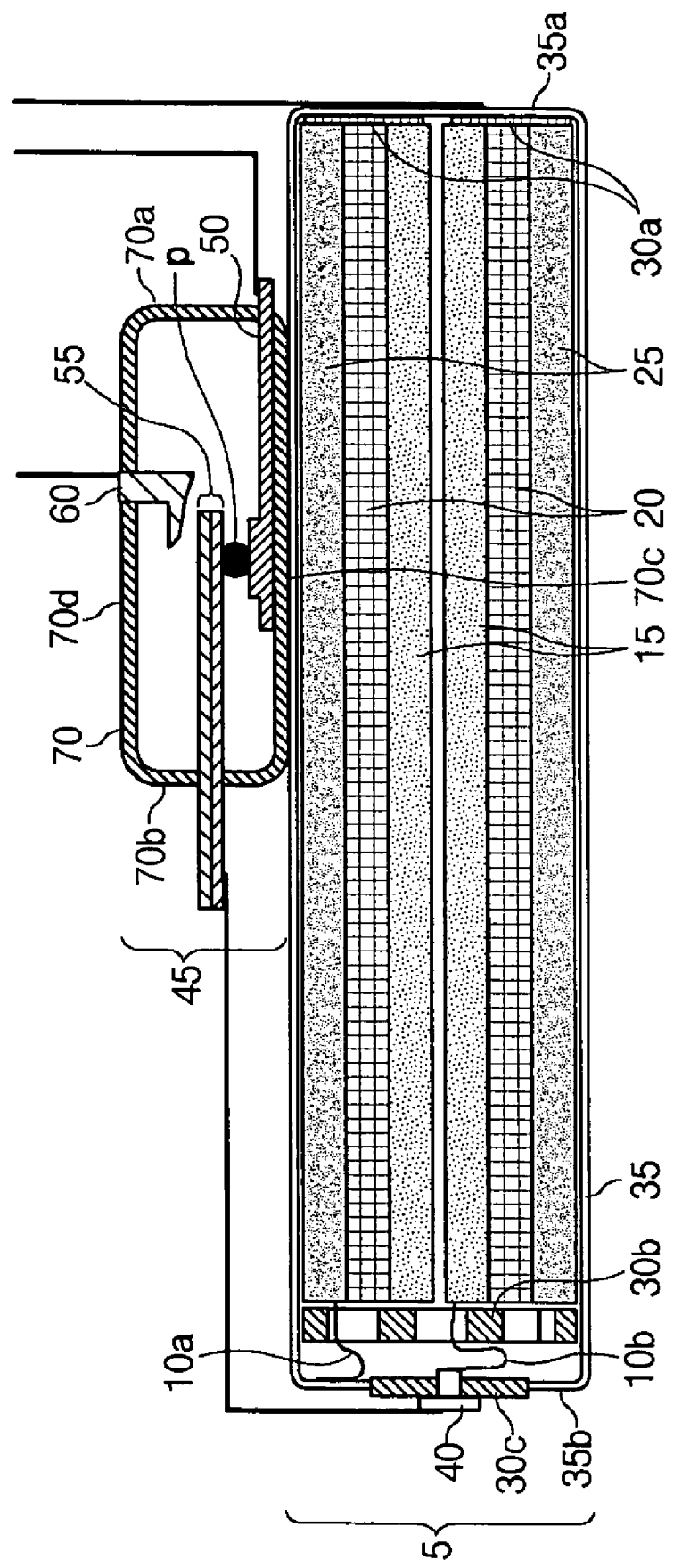
FIG. 1 illustrates a cross-sectional view of a secondary battery to which a battery protection device according to an exemplary embodiment of the present invention is applied.

Japanese Patent Application No. 2005-368443, filed on Dec. 21, 2005, in the Japanese Patent Office, and entitled "Protection Device for a Battery and Battery Having the Same," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a cross-sectional view of a lithium secondary battery 5 according to an exemplary embodiment of the present invention.

The lithium secondary battery 5 may include a battery unit having a negative electrode 15, a separator 20 containing an electrolyte, and a positive electrode 25, which may be stacked on one another and rolled. Insulation plates 30a and 30b may be respectively installed on opposite ends of the battery unit.

The battery unit may be received in a battery can 35, which may function as a positive electrode terminal (or a first output terminal). The battery can 35 may include a sealed bottom end 35a and a top end 35b, opposite the sealed bottom end 35a.

A negative electrode terminal 40 (or a second output terminal) may be installed in an opening of the top end 35b. An insulation sealing plate 30c may be interposed between the negative electrode terminal 40 and the top end 35b. The battery can 35 may be coupled to the positive electrode 25 by a positive tap 10a, and the negative electrode terminal 40 may be coupled to the negative electrode 15 by a negative tap 10b.

The lithium secondary battery 5 may enable charging/discharging by allowing lithium ions in the positive or negative electrodes 25 or 15 to travel through the separator 20. When the secondary battery 5 is overcharged, or a number of the charging/discharging cycles exceeds a desired range, lithium dendrites may be precipitated from the negative electrode 15.

When lithium dendrites are grown, they may penetrate the separator 20 and contact the negative electrode 15, thereby generating a short circuit. The short circuit may generate excess heat in the battery 5. This excess heat may cause the electrolyte in the separator 20 to boil, which may result in fire or explosion.

A battery protection device 45 may be provided on the lithium secondary battery 5 to prevent such a short circuit. The battery protection device 45 may include an electrically conductive plate 50, a thermally responsive operating plate (or a bimetal plate, hereinafter, "bimetal plate") 55, a stopper (or latch, hereinafter "latch") 60, which may be housed in a highly resistive housing 70. The housing 70 may include a bottom wall 70a and a top wall 70d, as well as a close wall 70c and a far wall 70d connecting the bottom wall 70a and the top wall 70b.

The electrically conductive plate 50 may extend through the bottom wall 70b and along the close wall 70c. The bimetal plate 55 may be installed above the electrically conductive plate 50, and may extend through the top wall 70b. The electrically conductive plate 50 and the bimetal plate 55 may be coupled to each other at a contact point P.

The latch 60 may be secured on or through the far wall 70d, and may be vertically formed above and spaced apart from a top surface of the bimetal plate 55. The electrically conductive plate 50, latch 60, and bimetal plate 55 may be coupled to a discharge circuit 75 (see FIG. 3C) that will be described below. This discharge circuit 75 may be provided between the positive electrode 25 and the positive electrode terminal, i.e., the battery can 35, and/or between the negative electrode 15 and the negative electrode terminal 40.

The bimetal plate 55 may have a thermally responsive structure formed by two alloy or metal plates having different coefficients of thermally expansion. Since the bimetal plate 55 operates in response to heat that is externally applied and internal heat generated by an overcurrent, an operating point of the bimetal plate 55 may be determined in accordance with a volume resistivity and a curvature coefficient of the battery 5.

That is, by selecting proper materials, the bimetal plate 55 may operate at a desired temperature. When the contact point's P resistance is too high, a resistance loss may be generated. When the contact point's P resistance is too low, self-heat generation may be reduced, which may reduce insulation of the device 45 from the battery 5. The contact point P may have a resistance of about 300 MΩ. The bimetal plate 55 may be formed of a combination of, e.g., a Ni—Cu alloy plate and a Ni plate.

Two or more latches 60 may be installed. The latch may be configured to actively, simultaneously, and reliably perform an unrecoverable operation and a recoverable operation, e.g., may function similarly to a spring, at certain temperatures or temperature ranges.

Examples of materials that may be used for the latch 60 include a metal alloy, an electrically conductive resin containing metal particles or carbon particles, and a positive temperature coefficient (PTC) material. PTC materials may be a polymer-based material or a ceramic-based material. PTC materials do not conduct electricity, i.e., allow for discharging in the present case, in a highly resistive trip state during battery heat generation upon latching, and conduct electricity, i.e., allow for charging, only when the resistance value is reduced in accordance with a reduction in temperature.

Figure 3A:
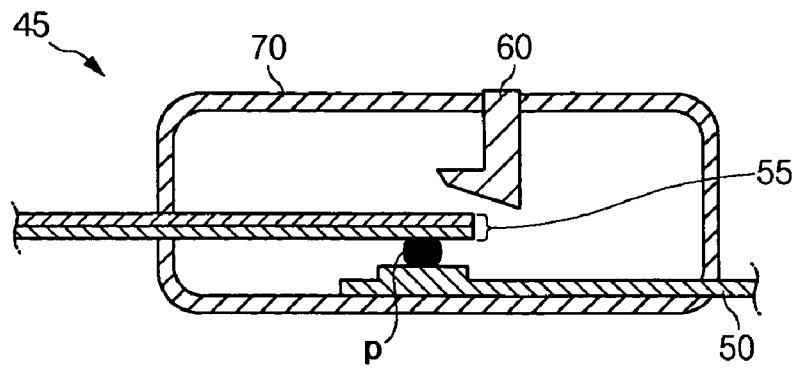
Figure 3B:
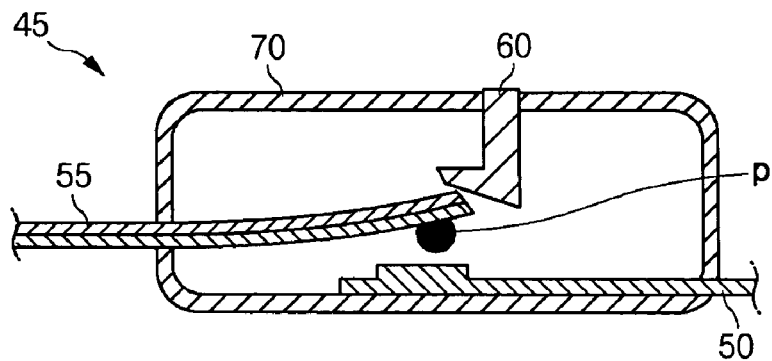
Figure 3C:
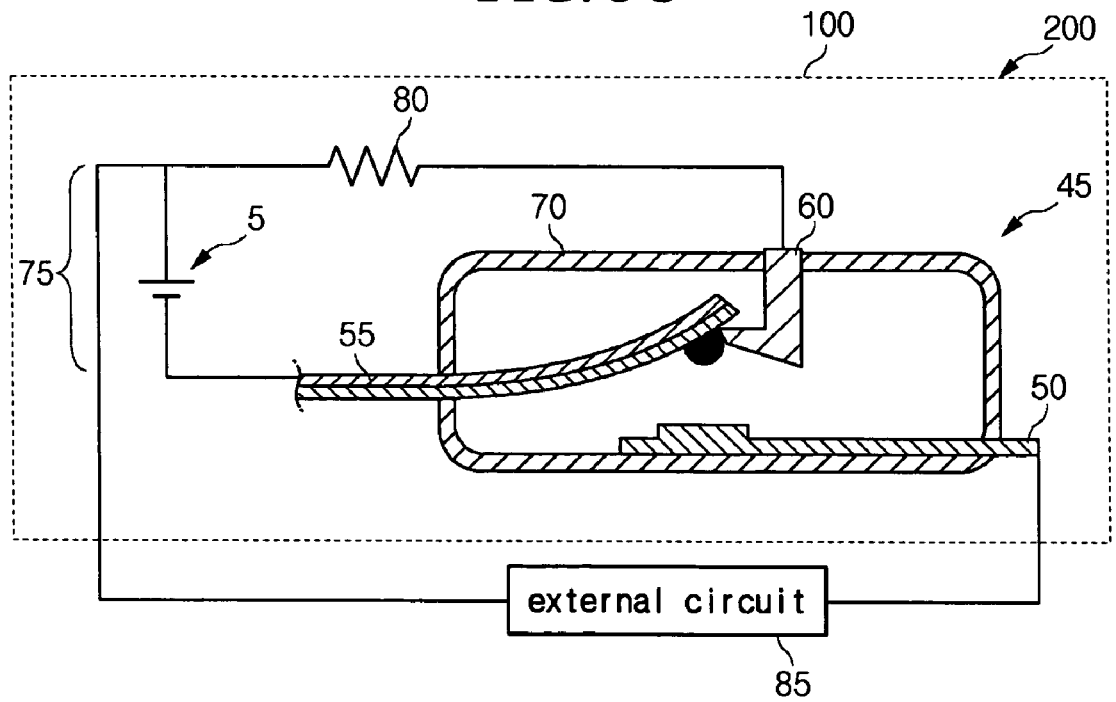

As can be seen in FIG. 3C, the lithium secondary battery 5, the battery protection device 45, and the discharge circuit 75 may be installed in a case 100 to constitute a battery pack 200. One or more of the lithium second batteries 5 may be provided in the case 100.

The following will describe an operation of the battery protection device 45 of the present exemplary embodiment.

Figure 2:
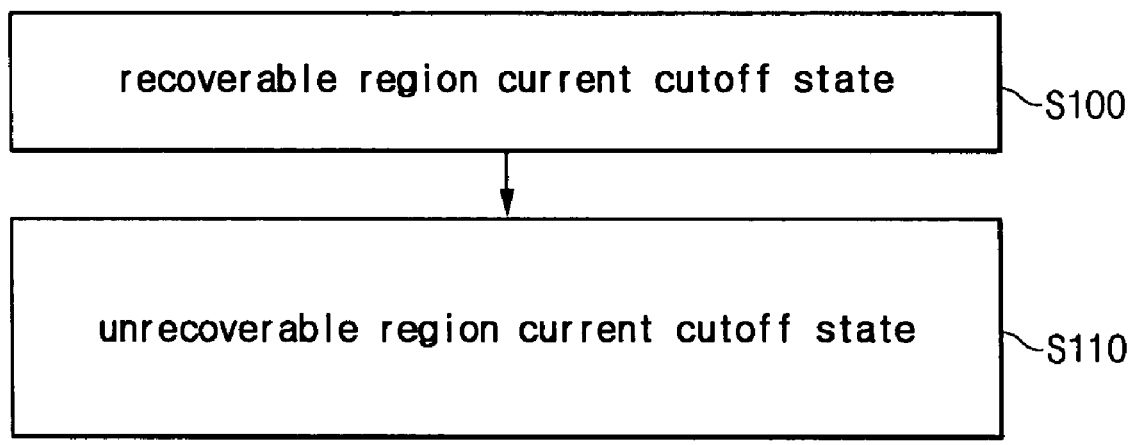
FIG. 2 illustrates a flowchart of an operation of a battery protection device according to an exemplary embodiment of the present invention.

FIG. 2 illustrates a flowchart of an operation of the battery protection device 45. FIGS. 3A through 3C illustrate schematic views of an operation of the battery protection device 45. FIG. 3A illustrates a recoverable region current cutoff state that is electrically conductive, FIG. 3B illustrates a recoverable region current cutoff state that is not electrically conductive, and FIG. 3C illustrates an unrecoverable region current cutoff state.

As shown in FIG. 3A, when the lithium secondary battery 5 is in a normal state of operation, the bimetal 55 contacts the electrically conductive plate 50 via the contact point P for electric conduction.

When a temperature of the lithium secondary battery 5 increases above, e.g., about 75° C., the bimetal 55 may bend towards the latch 60, and the contact point P may be dissociated, resulting in an insulation state, as shown in FIG. 3B.

When the temperature of the lithium secondary battery 5 is within a ranges, e.g., from about 75° C. to 110° C., the bimetal 55 may be in a recoverable region current cutoff state, in which the bimetal 55 is not interlocked with the latch 60. In this recoverable region cutoff state, conduction and insulation may be repeatedly performed (S100), i.e., may repeatedly move between FIG. 3A and FIG. 3B.

When the temperature of the lithium secondary battery 5 increases, e.g., approaches a boiling point of the electrolyte in the separator 20, e.g., above about 110° C., the bimetal plate 55 may be further bent over the latch 60, and may thus be rendered unrecoverable due to interaction of the bimetal plate 55 with the latch 60, as shown in FIG. 3C. Simultaneously, the bimetal plate 55 may be electrically connected to the latch 60, thus turning on the discharge circuit 75. That is, a discharge resistor 80 of the discharge circuit 75 may generate heat to consume residual energy of the battery. As a result, the lithium secondary battery 5 may enter the unrecoverable region current cutoff state (S110).

As can be seen in FIG. 3C, the bimetal plate 55 may be coupled, e.g., to the negative electrode terminal 40 of the lithium secondary battery 5, and the latch 60 may be coupled, e.g., to the positive electrode terminal, i.e., the battery can 35, of the lithium secondary battery 5 through the discharge resistor 80 of the discharge circuit 75.

When the electrically conductive plate 50 contacts the contact point P of the bimetal 55, as shown in FIG. 3A, an external circuit may be connected to the lithium secondary battery 5 via the electrically conductive plate 50. When the bimetal 55 contacts the latch 60 as shown in FIG. 3C, the discharge circuit 75 may be closed, and, thus, power of the lithium secondary battery 5 may flow to the discharge resistor 80.

As described above, when the bimetal plate 55 is unrecoverably fixed to the latch 60, as shown in FIG. 3C, the residual electric energy of the lithium secondary battery 5 may be gradually discharged by the discharge resistor 80. At this point, when a current value flowing along the discharge resistor 80 is too high, the amount of heat generated by the lithium secondary battery 5 increases. Therefore, by properly setting a resistance value of the discharge resistor 80, the residual electric energy of the lithium secondary battery 5 may be slowly and gradually discharged, and, thus, excessive heat generation can be prevented. This will be described in more detail below.

As described above, according to the battery protection device 45 of this exemplary embodiment, within a predetermined temperature range, the bimetal plate 55 may be in the recoverable current cutoff state where it can repeatedly be in contact with or dissociated from the electrically conductive plate 50. In addition, when the temperature exceeds a maximum temperature of the predetermined temperature range, the bimetal plate 55 may be placed in the unrecoverable current cutoff state, where it is dissociated from the electrically conductive plate 50 and unrecoverably fixed to the latch 60. In this unrecoverable current cutoff state, the residual battery capacity of the lithium secondary battery 5 may be safely consumed.

The above-described battery protection device 45 may minimize a number of parts therein and may have a small form factor.

The exemplary embodiment of the present invention will be described in more detail with reference to specific examples. Table 1 shows a relationship between an unrecoverable cutoff temperature and overcharging conditions of the battery protection device 45 of the exemplary embodiment.

TABLE 1

| | Unrecoverable Cutoff Temperature(° C.) | | | |
|---|---|---|---|---|
| | 90 | 100 | 110 | 120 |
| Overcharging Condition 1 | □ | □ | □ | □ |
| Overcharging Condition 2 | ○ | □ | □ | ◇ |

In Table 1, "Overcharging Condition 1" is that in which electric power of 12 volts with 1 ampere is applied, and "Overcharging Condition 2" is that in which electric power of 12 volts with 5 amperes is applied. The lithium secondary battery used in the test was a prismatic lithium ion battery having a capacity of 1.0 Ah.

"Unrecoverable Cutoff Temperature" is a temperature at which the bimetal plate 55 is in the unrecoverable region current cutoff state where the bimetal plate 55 is unrecoverably fixed to the latch 60. The unrecoverable cutoff temperature was set at 90° C., 100° C., 110° C. and 120° C., In addition, a cutoff temperature at which the contact point P of the bimetal plate 55 is dissociated from the electrically conductive plate 50 was set at 75° C.

In evaluation of these results, ⌜□⌟means that the cutoff operation is effectively realized, ⌜○⌟means that the cutoff operation is safely realized by the self-heat generation of the device, and ⌜◇⌟means that the battery generates heat due to the flow of current.

As shown in Table 1, for the overcharging condition 1, the cutoff operation was effectively realized at every temperature. However, in the overcharging condition 2, at the temperature of 120° C. where the unrecoverable region current cutoff state is realized, the heat generation of the battery significantly increased. Therefore, the unrecoverable region current cutoff temperature may be between about 90° C. to 110° C.

Table 2 shows discharge time in the unrecoverable region current cutoff state depending on a relationship between a resistance of the discharge resistor 80 and a battery capacity.

TABLE 2

| | Battery Capacity(Ah) | | | |
|---|---|---|---|---|
| Resistance (kΩ) | 0.5 | 1.0 | 2.9 | 5.0 |
| 0.01 | ○ (1 hour) | Δ (2 hours) | ◇ (>>100 days) | ◇ (>>100 days) |
| 0.1 | □ (12 hours) | □ (1 day) | Δ (3 days) | ◇ (>>100 days) |
| 1.0 | □ (5 days) | □ (8 days) | □ (17 days) | □ (42 days) |
| 10 | □ (40 days) | ○ (80 days) | ○ (>100 days) | ○ (>100 days) |

In Table 2, a column indicates the resistance of the discharge resistor 80 and a row indicates the battery capacity.

The resistance value of the discharge resistor 80 was 0.01 kΩ, 0.1 kΩ, 1 kΩ, and 10 kΩ. The capacity battery capacity was 0.5 Ah, 1.0 Ah, 2.0 Ah, and 5.0 Ah. An overcharging test condition was 13 volts with 1 ampere. In evaluating these results, 「□」means that the discharge operation is very effectively realized, 「o」means that the discharge operation is effectively realized, 「Δ」means that the battery significantly generates heat and 「◊」means that the battery very significantly generates heat due to the low discharge current.

In Table 2, values within the parentheses indicate the actual discharge time taken for completely consuming the battery capacity.

As shown in Table 2, when the resistance of the discharge resistor 80 ranges from 1.0 kΩ to 10 kΩ, the discharge operation may be effectively realized, regardless of the battery capacity. That is, when the discharge resistor 80 having such a resistance range is used, the residual battery capacity may be slowly and gradually consumed, thus realizing a safe secondary battery.

Further, as the resistance of the discharge resistor 80 and the battery capacity increase, the discharge time increases. For example, when the resistance value of the discharge resistor 80 is 10 kΩ and the battery capacity is 5.0 Ah, the time for the discharge becomes much greater than 100 days, e.g., greater than one year.

In addition, it can be further noted that, as the resistance value decreases and the battery capacity increases, an amount of the discharge current increases. For example, when the resistance of the discharge resistor 80 is 0.01 kΩ or 0.1 kΩ, and the battery capacity is 5.0 Ah, the discharge current increases, and the battery generates heat. In this case, the discharge resistor 80 may be damaged.

Figure 4A:
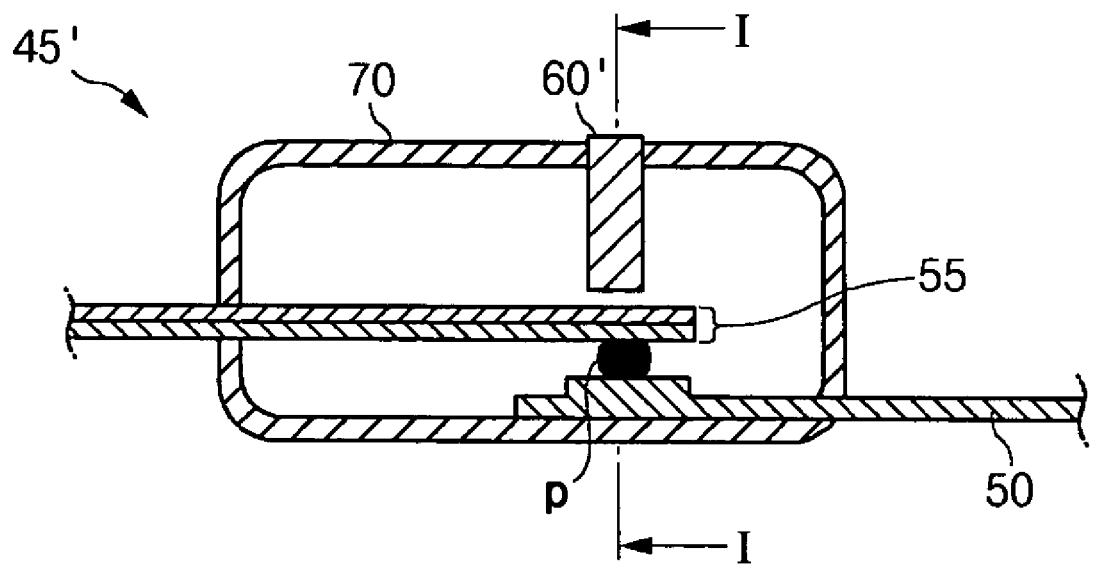
Figure 4B:
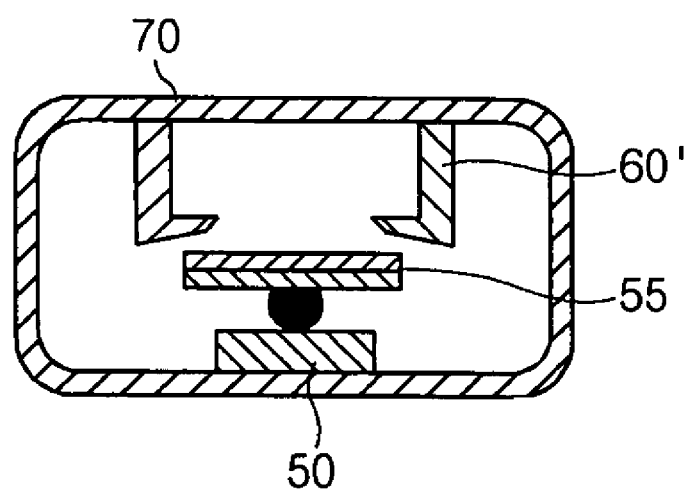

FIGS. 4A and 4B illustrate sectional views of a battery protection device according to another exemplary embodiment of the present invention. FIG. 4A illustrates a cross-sectional view of a recoverable region current cutoff state, and FIG. 4B illustrates a sectional view taken along line I-I of FIG. 4A.

Figure 5A:
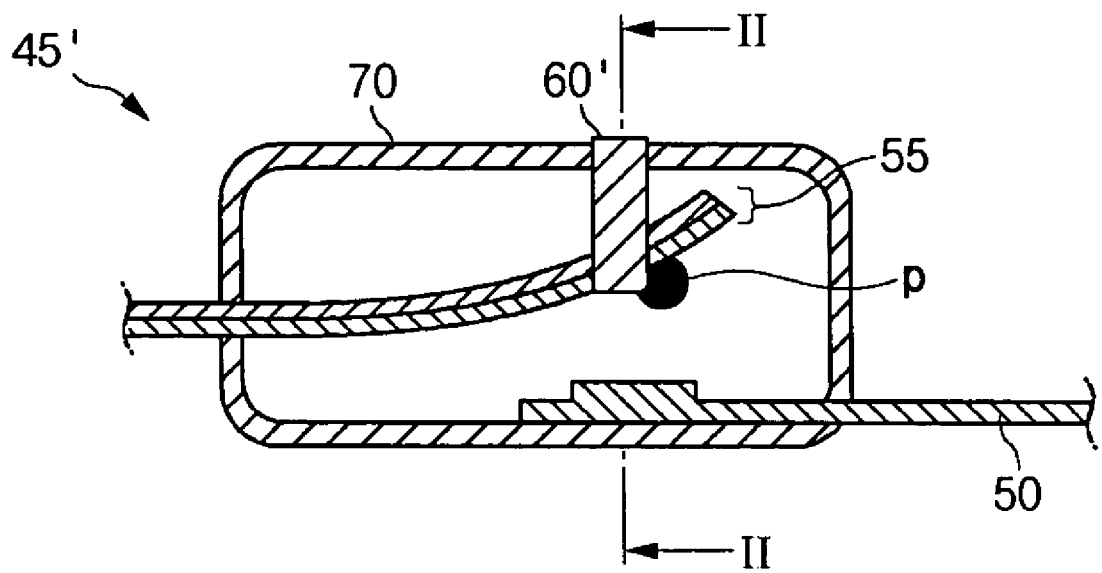
Figure 5B:
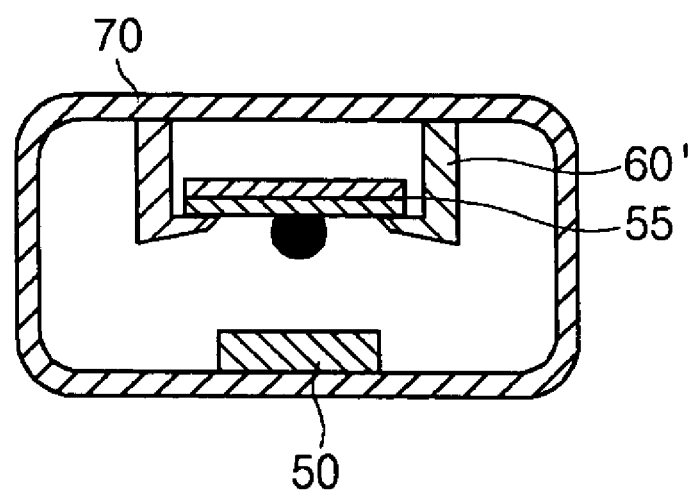

FIGS. 5A and 5B illustrate schematic views of the battery protection device of FIGS. 4A and 4B, respectively, wherein FIG. 5A illustrates an unrecoverable region current cutoff state, and FIG. 5B illustrates a sectional view taken along line I-I of FIG. 5A.

As shown in FIGS. 4A and 4B, a battery protection device 45' of this exemplary embodiment may include a pair of latches 60' arranged facing one another in a lateral direction of the bimetal plate 55.

In a recoverable region current cutoff state, as in the case of FIGS. 3A and 3B, the contact point P of the bimetal plate 55 may move repeatedly between the pair of latches 60' and the electrically conductive plate 50, as shown in FIGS. 4A and 4B.

When the temperature increases above a predetermined temperature, the bimetal plate 55 may further bend over the pair of latches 60' to be in the unrecoverable region current cutoff state, as shown in FIGS. 5A and 5B. In other words, the bimetal plate 55 may be unrecoverably fixed to the pair of latches 60'.

As described, when the pair of latches 60' are arranged to fix the bimetal 55 in the lateral direction of the bimetal plate 55, functioning equivalent to that of the case of FIGS. 3A to 3C may be realized.

Although exemplary embodiments of the present invention have been shown and described, it will be appreciated by those skilled in the art that changes may be made in this embodiment. In the exemplary embodiments, the recoverable cutoff state and unrecoverable cutoff state may be realized using the bimetal plate and the latch, a latch having an actuation property may be also used to provide an equivalent function.

Figure 6A:
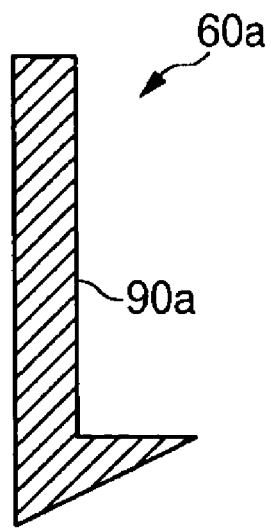
FIGS. 6A and 6B illustrate a schematic view of a modified example of a latch of the battery protective device.
Figure 6B:
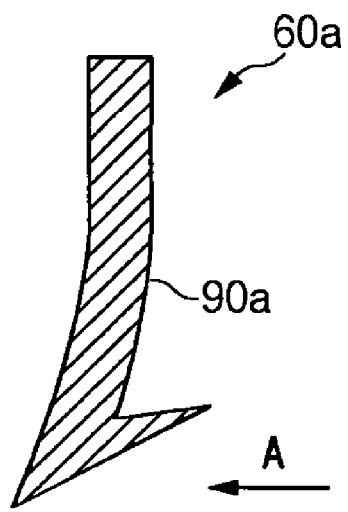
Figure 7A:
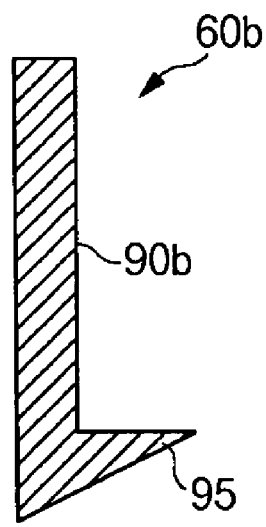
FIGS. 7A and 7B illustrate a schematic view of another modified example of a latch of the battery protective device.
Figure 7B:
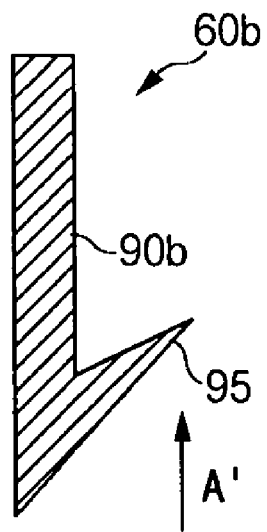

For example, as shown in FIG. 6A, in a state where a support 90a of a latch 60a is straight, the support 90a may be bent in a direction A, as shown in FIG. 6B, and returned to its straight position. In addition as shown in FIG. 7A, in a state where a support 90b of a latch 60b is straight, a hook portion 95 may be bent in a direction A' to an acute angle state, as shown in FIG. 7B. These two examples may realize an equivalent function to the other exemplary embodiments of the present invention.

By the above-described structure, the space of the battery protection device 45 can be more saved.

In addition, although the bimetal plate 55 may be formed of two metal plates differing in a thermally conductivity, there present invention is not limited to this configuration. For example, the bimetal plate 55 may be formed with three or more different metal plates.

In addition, in the present exemplary embodiment, although a prismatic lithium secondary battery is used as an example, the present invention is not limited to this example. For example, a cylindrical battery may also be used. It will be appreciated by those skilled in the art that changes of materials for the bimetal and latch, an operation temperature, dimension, a material for electrodes, a shape of the lithium secondary battery may be made without departing from the features of the present invention, the scope of which is defined in the present invention.

According to the present invention, a battery protection device having an unrecoverable region current cutoff state and a recoverable region current cutoff state and a battery having the battery protection device are provided.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery protection device, comprising:
   a thermally responsive operating plate having two plates secured together, the two plates having different coefficients of thermal expansion;
   an electrically conductive member; and
   a stopper configured to interlock with the thermally responsive operating plate,
   the thermally responsive operating plate, the electrically conductive member, and the stopper co-operating with each other and being arranged to cause the battery protection device to enter into:
   a recoverable region current cutoff state, where the thermally responsive operating plate is not interlocked with the stopper, and electrical contact and dissociation of the thermally responsive operation plate with and from the electrically conductive member is repeatedly realized; and
   an unrecoverable region current cutoff state, where the thermally responsive operating plate is interlocked with the stopper, and the thermally responsive operation plate is unrecoverably dissociated from the electrically conductive member.

2. The battery protection device as claimed in claim 1, wherein, when a temperature exceeds a predetermined temperature, the thermally responsive operating plate is interlocked with the stopper.

3. The battery protection device as claimed in claim 2, wherein the predetermined temperature is between about 90° C. to 110° C.

4. The battery protection device as claimed in claim 1, wherein the two plates are metal plates.

5. The battery protection device as claimed in claim 4, wherein the metal plates are nickel plate and a nickel-alloy plate.

6. The battery protection device as claimed in claim 1, wherein the battery protection device enters the recoverable region current cutoff state when a temperature increases above a first temperature.

7. The battery protection device as claimed in claim 6, wherein, below the first temperature, the thermally responsive operating plate is in continuous electrical contact with the electrically conductive member.

8. The battery protection device as claimed in claim 6, wherein the battery protection device enters the unrecoverable region current cutoff state when a temperature increases above a second temperature.

9. The battery protection device as claimed in claim 8, wherein the second temperature is between about 90° C. to 110° C.

10. The battery protection device as claimed in claim 6, wherein the first temperature is about 75° C.

11. The battery protection device as claimed in claim 1, wherein the stopper includes metal, a metal alloy, an electrically conductive resin containing metal particles or carbon particles, or a positive temperature coefficient material containing polymer or ceramic.

12. A battery, comprising:
a battery unit having positive and negative electrodes;
a battery protection device including
a thermally responsive operating plate having two plates secured together, the two plates having different coefficients of thermal expansion,
an electrically conductive member, and
a stopper configured to interlock with the thermally responsive operating plate,
the thermally responsive operating plate, the electrically conductive member, and the stopper co-operating with each other and being arranged to cause the battery protection device to enter into:
a recoverable region current cutoff state, where the thermally responsive operating plate is not interlocked with the stopper, and electrical contact and dissociation of the thermally responsive operation plate with and from the electrically conductive member is repeatedly realized; and
an unrecoverable region current cutoff state, where the thermally responsive operating plate is interlocked with the stopper, and the thermally responsive operation plate is unrecoverably dissociated from the electrically conductive member,
a first output terminal connected to the positive electrode; and
a second output terminal connected to the negative electrode.

13. The battery as claimed in claim 12, further comprising a discharge resistor provided between the positive electrode and the first output terminal and/or between the negative electrode and the second output terminal.

14. The battery as claimed in claim 13, wherein a resistance of the discharge resistor ranges from about 1.0 kΩ to 10 kΩ.

15. The battery as claimed in claim 12, wherein the battery protection device enters the recoverable region current cutoff state when a temperature increases above a first temperature.

16. The battery as claimed in claim 15, wherein, below the first temperature, the thermally responsive operating plate is in continuous electrical contact with the electrically conductive member.

17. The battery as claimed in claim 16, wherein the battery protection device enters the unrecoverable region current cutoff state when a temperature increases above a second temperature.

18. The battery as claimed in claim 17, wherein the second temperature is less than a boiling point of an electrolyte used in the battery unit.

19. A battery pack, comprising:
a battery unit having positive and negative electrodes;
a battery protection device, including a thermally responsive operating plate having two plates secured together, the two plates having different coefficients of thermal expansion, an electrically conductive member, and
a stopper configured to interlock with the thermally responsive operating plate the thermally responsive operating plate, the electrically conductive member, and the stopper co-operating with each other and being arranged to cause the battery protection device to enter into:
a recoverable region current cutoff state, where the thermally responsive operating plate is not interlocked with the stopper, and electrical contact and dissociation of the thermally responsive operation plate with and from the electrically conductive member be is repeatedly realized; and
an unrecoverable region current cutoff state, where the thermally responsive operating plate is interlocked with the stopper, and the thermally responsive operation plate is
unrecoverably dissociated from the electrically conductive member,
a first output terminal connected to the positive electrode;
a second output terminal connected to the negative electrode; and
a discharge circuit provided between the positive electrode and the first output terminal and/or between the negative electrode and the second output terminal.

20. The battery pack as claimed in claim 19, wherein the discharge circuit includes a discharge resistor.

21. The battery pack as claimed in claim 20, wherein a resistance of the discharge resistor ranges from 1.0 kΩ to 10 kΩ.

22. The battery protection device as claimed in claim 1, wherein the thermally responsive operating plate is a bimetal plate.

* * * * *

UNITED STATES PATENT AND TRADEMARK OFFICE
CERTIFICATE OF CORRECTION

| | | |
|---|---|---|
| PATENT NO. | : 7,638,978 B2 | Page 1 of 1 |
| APPLICATION NO. | : 11/642980 | |
| DATED | : December 29, 2009 | |
| INVENTOR(S) | : Koike et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Twenty-first Day of December, 2010

David J. Kappos
*Director of the United States Patent and Trademark Office*